US005659757A

United States Patent [19]
Browning et al.

[11] Patent Number: 5,659,757
[45] Date of Patent: Aug. 19, 1997

[54] METHOD AND SYSTEM FOR LOCK INSTRUMENTATION IN A DATA PROCESSING SYSTEM

[75] Inventors: Luke Matthew Browning; John Thomas O'Quinn, II; Jeffrey Scott Peek, all of Austin, Tex.

[73] Assignee: International Business Machines Corporation, Armonk, N.Y.

[21] Appl. No.: 430,078

[22] Filed: Apr. 27, 1995

[51] Int. Cl.$^6$ ............................................. G06F 13/00
[52] U.S. Cl. ............................. 375/726; 395/701
[58] Field of Search ................................. 395/726, 650, 395/701

[56] References Cited

U.S. PATENT DOCUMENTS

| | | |
|---|---|---|
| 5,060,144 | 10/1991 | Sipple et al. . |
| 5,175,852 | 12/1992 | Johnson et al. . |
| 5,202,971 | 4/1993 | Henson et al. . |
| 5,285,528 | 2/1994 | Hart . |
| 5,287,521 | 2/1994 | Nitta et al. . |
| 5,327,556 | 7/1994 | Mohan et al. . |

OTHER PUBLICATIONS

IBM TDB, "Conventional Locking", vol. 32, No. 8A, Jan. 1990, pp. 213–214.
IBM TDB, "Suspend Locking With A Single Lock to Control Program Execution", vol. 18, No. 6, Nov. 1975, pp. 1960–1961.
IBM TDB, "System Support For Multiprocessor Without An Atomic Storage", vol. 33, No. 9, Feb. 1991, pp. 18–23.

*Primary Examiner*—Jack B. Harvey
*Assistant Examiner*—John Travis
*Attorney, Agent, or Firm*—Richard A. Henkler

[57] ABSTRACT

A method and system for using a single lock data structure for executing either development or non-development lock primitives contained within a kernel. The kernel includes a mode indication flag, which can be set by the user, for indicating whether the kernel is to operate in a development or a non-development mode. During the execution of the kernel, the mode indication flag is examined and the appropriate set of lock primitives is overlayed. During execution of the kernel in development mode, the single lock data structure is received in the kernel, and a development lock data structure is allocated. The data from the single lock data structure is copied to the development lock data structure, and the lock data structure is overloaded (redefined) as a pointer to the physical address of the development lock data structure. Finally, the lock data structure is initialized to point to the physical address of the development lock data structure. Thereby allowing the user to have full access to the development lock primitives using the redefined lock data structure.

20 Claims, 2 Drawing Sheets

METHOD AND SYSTEM FOR LOCK INSTRUMENTATION IN A DATA PROCESSING SYSTEM

BACKGROUND

1. Field of the Present Invention

The present invention generally relates to data processing systems, and more specifically, to methods and systems for lock instrumentation within the data processing system.

2. History of Related Art

In a multi-processing environment, an operating system executes multiple processes concurrently. A Process, as referred to hereinafter, refers to an operating system entity associated with a unit of work or task.

During the execution of a process, the process may require the use of various resources, such as a CPU, memory, an input/output device, and the like. In a multi-processing environment these resources are shared, thus, conflicts arise between different processes which desire access to the same resource. These conflicts are managed by the operating system through the use of lock data structures and lock functions (primitives).

Currently, the industry has utilized two types of lock data structures, instrumentation and non-instrumentation. Instrumentation lock data structures, typically, include information related to the development of accessories for the operating system, such as device drivers. Non-instrumentation lock data structures are optimized versions of the instrumentation lock data structures, and therefore, are void of any unnecessary development information.

Operating system programs, such as kernel extensions, which use the lock data structures are developed so as to support the use of either the istrumentation or non-instrumentation lock data structures. However, before compilation of the operating system programs, an instrumentation or non-instrumentation lock data structure must be selected.

Currently, lock data structures are, typically, created using a conditional compilation directive for the type definition of the lock data structure. Many high level computer programming languages offer conditional compilation directives, for example, in the C++ computer programming language, one such conditional compilation directive is the C++ "#ifdef". An example of how the "#ifdef" conditional compilation directive can be used to create a lock data structure is illustrated below in TABLE I.

TABLE I

```
Typedef
{
    int variable1;
#ifdef instrumentation /** development variables**/
    int variable2;
    int variable3;
#endif
    longint variable4;
}lockword;
```

In this example, the compiler, during compilation, will determine the contents for the data structure "lockword", and therefore, whether the "lockword" is of a instrumentation or non-instrumentation type. If the variable "instrumentation" is set, then the lockword data structure will include variables 1–4 which are used for development. The inclusion of variables 1–4 results in the definement of the lockword data structure as an instrumentation lock data structure. If, however, the variable "instrumentation" is not set, then the lockword data structure will only include variable1 and variable4. Accordingly, the lockword data structure will be defined as a non-instrumentation lock data structure. The advantage of using such a conditional compilation statement is that a common source exists for determining the definition of the lock data structure.

There are, however, several disadvantages associated with using two different lock word data structures. One such disadvantage is that two separate sets of executable files are created for the same operating system. One set of executable files is used for developing accessories for the operating system, and the other set for use by the end user. Hence, the management and coordination of the operating system is doubled. Another such disadvantage, is when a user of the operating system compiled with the non-instrumentation lock data structure requires the additional information stored in the instrumentation lock data structure. Unfortunately, this results in providing the user with the operating system, compiled with the instrumentation lock data structure via shipping or other means. This is cost prohibitive.

It would be a distinct advantage to have a method and system in which a single lock data structure could be used by a caller of the locking functions for use in either the development of accessories or for use by an enduser. The present invention provides such a method and system.

SUMMARY OF THE PRESENT INVENTION

The present invention is a method and system for allowing a user to selectively execute instrumentation or non-instrumentation lock primitives contained within a kernel.

In one aspect, the present invention is a method of using a single lock data structure for executing either development or non-development lock primitives. The method includes the step of selecting either the development or non-development lock primitives for execution. The method also includes the step of overlaying selected lock primitives, and one of the selected lock primitives is executed, the executed lock primitive using the single lock data structure.

In one aspect, the present invention is a method of using a single block data structure for executing either development or non-development lock primitives. The method includes the step of selecting either the development or non-development lock primitives for execution. The method also includes the step of overlaying the selected lock primitives. The method further includes the step of executing one of the selected lock primitives, the one of the selected lock primitive using the single lock data structure.

In yet another aspect, the present invention is a data processing system for using a single lock data structure for executing either development or non-development lock primitives contained within a kernel. The kernel includes a development or non-development mode.

The data processing system includes means for determining that the kernel is operating in the development mode. The data processing system also includes means for overlaying, in response to the determination, the development lock primitives. The data processing further includes means for receiving the single lock data structure in the kernel. The data processing also includes means for allocating a development lock data structure.

The data processing system further includes means for copying data contained within the received lock data structure into the development lock data structure. The data processing system also includes means for redefining the received lock data structure as a pointer to the physical address of the development lock data structure. The data processing system also includes means for initializing the redefined locked data structure to point to the physical address of the development lock data structure.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
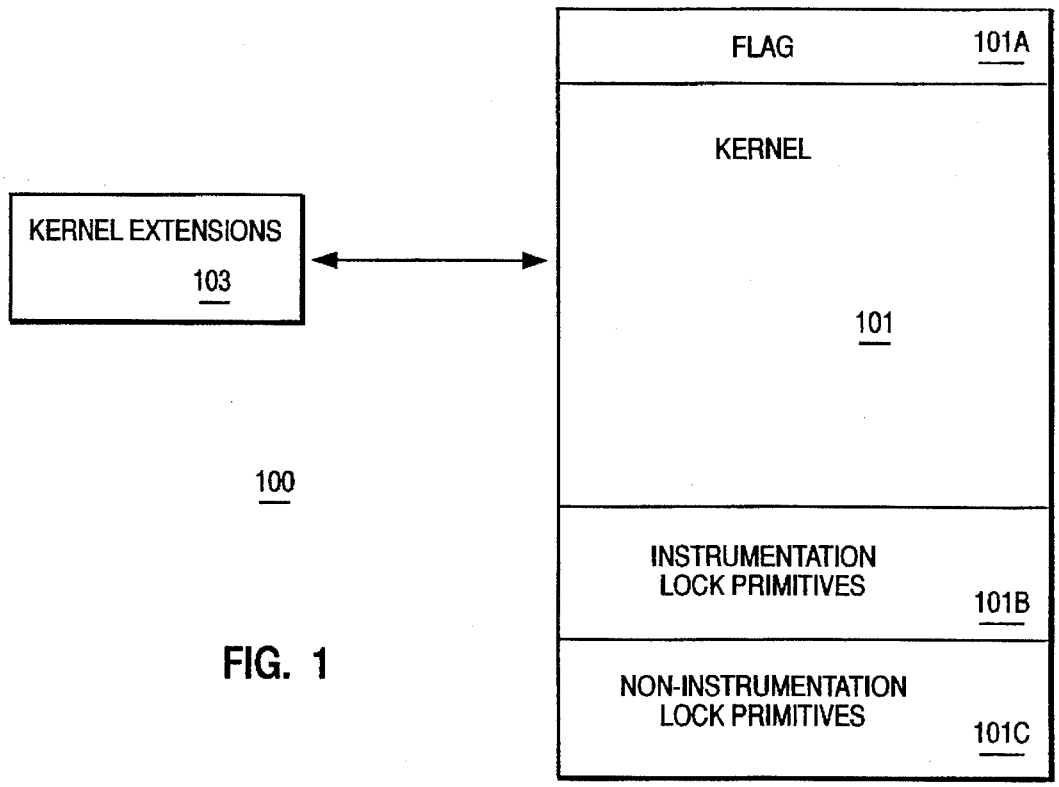
FIG. 1 is a schematic diagram illustrating a multi-processing operating system in which the present invention is practiced.

Reference now being made to FIG. 1, a schematic diagram is shown illustrating a multi-processing operating system 100 in which the present invention is practiced. The operating system 100 includes a kernel 101 and a kernel extensions 103. Operating system 100 may be, for example, IBM Corp.'s Advanced Interactive Executive (AIX). Details of the AIX operating system are explained in the "AIX Version 4.0 Commands Reference" manual, by IBM, which is hereby incorporated by reference herein. Kernel 101, essentially, provides a set of largely machine independent functions, and includes a mode indication flag 101A, instrumentation lock primitives 101B, and non-instrumentation lock primitives 101C. The Kernel 101 operates in either an instrumentation mode or a non-instrumentation mode. Mode indication flag 101A determines the mode of operation for the kernel 100. The two modes of operation are supported through the use of overlays. Overlays are a method for allowing a single function call to invoke one or more different overlay functions. A function descriptor having a physical address for one of the overlay functions is associated with the single function call. Overlaying is accomplished by changing the physical address specified by the function descriptor to a different overlay function.

Figure 2:
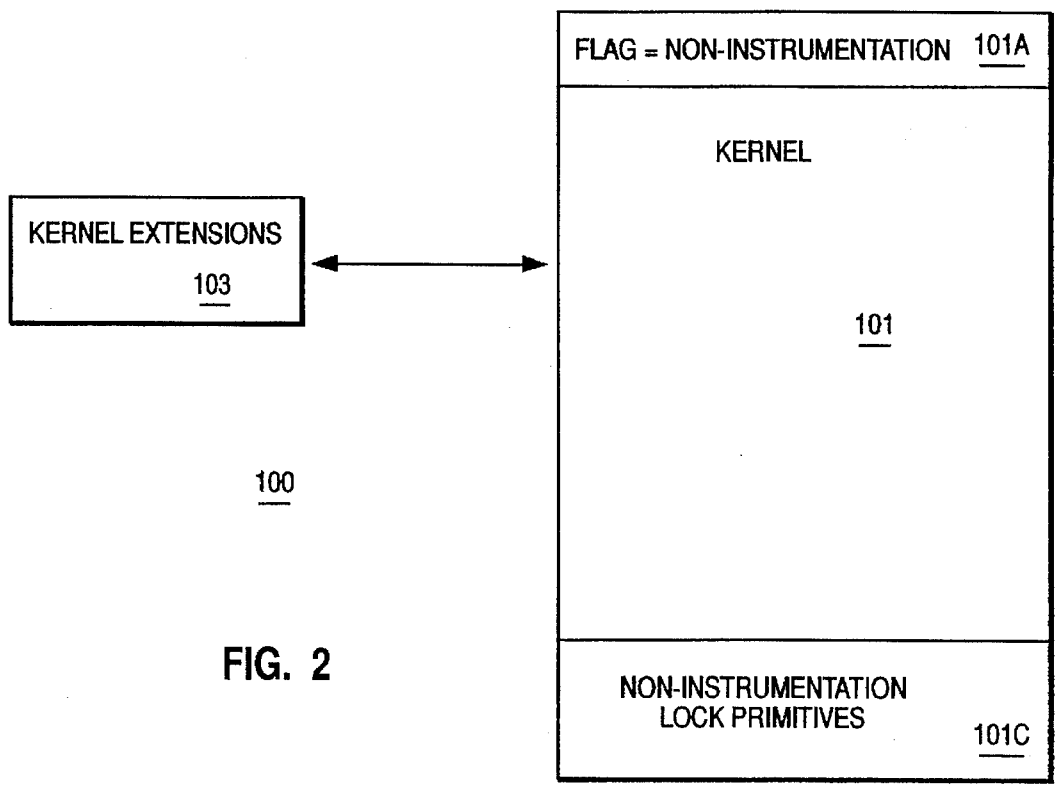
FIG. 2 is a schematic diagram illustrating the operating system of FIG. 1 executing in a non-instrumentation mode according to the teachings of the present invention.
Figure 3:
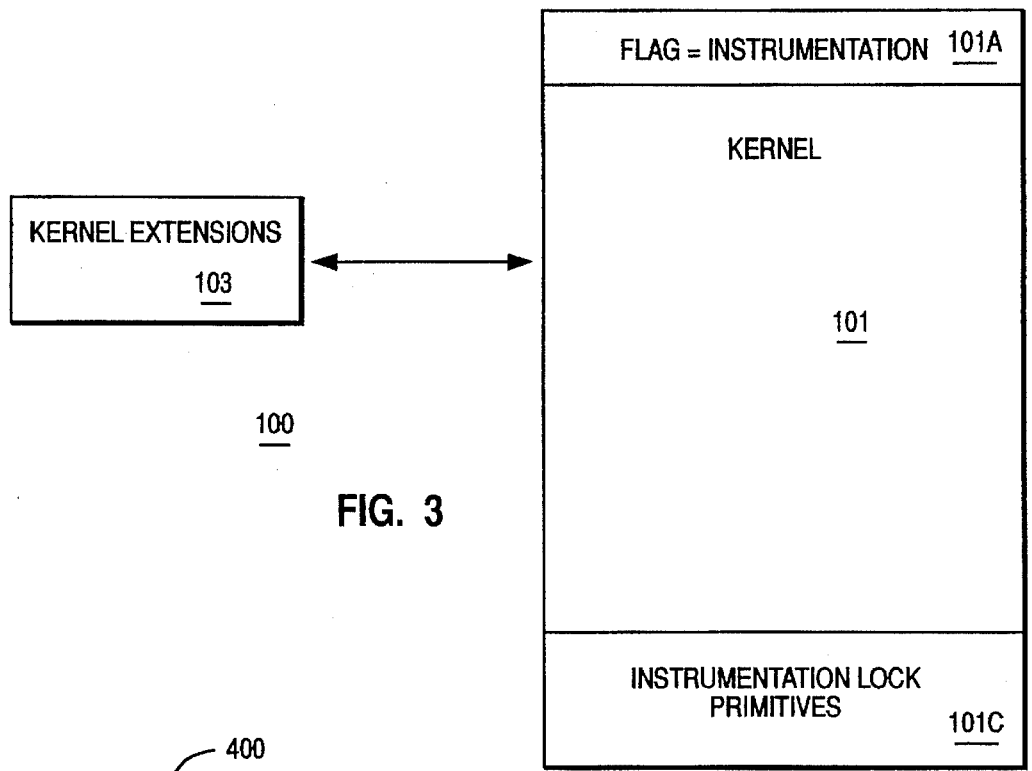
FIG. 3 is a schematic diagram illustrating the operating system of FIG. 1 executing in an instrumentation mode according to the teachings of the present invention.

Reference now being made to FIG. 2, a schematic diagram is shown for illustrating the operating system 100 of FIG. 1 executing in a non-instrumentation mode according to the teachings of the present invention. During initialization of the operating system 100, mode indication flag 101A was determined to indicate a mode of non-instrumentation. Accordingly, the non-instrumentation lock primitives 101C were selected using overlays. Reference now being made to FIG. 3, a schematic diagram is shown for illustrating the operating system 100 of FIG. 1 executing in an instrumentation mode according to the teachings of the present invention. During initialization of the operating system 100, mode indication flag 101A was determined to indicate a mode of instrumentation. Accordingly, the instrumentation lock primitives were selected using overlays.

Figure 4:
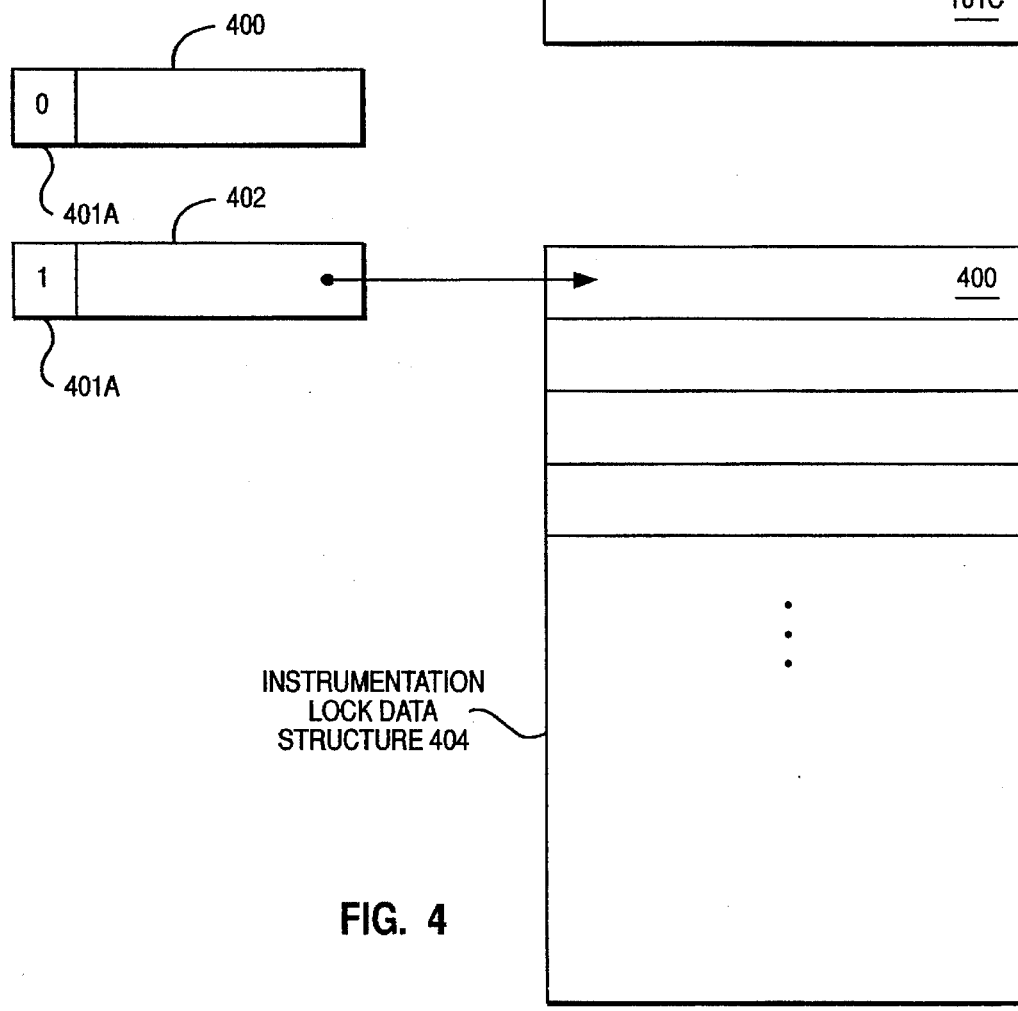
FIG. 4 is a block diagram illustrating the overloading of a lock data structure to point to an instrumentation lock data structure using the operating system of FIG. 3 according to the teachings of the present invention.

In the preferred embodiment of the present invention, callers which require the use of a lock data structure are required to allocate the lock data structure. Furthermore, the high order bit of the allocated lock data structure is reserved for use by the kernel 100. Reference now being made to FIG. 4, a block diagram is shown for illustrating the overloading of a lock data structure 400 to point to an instrumentation lock data structure 404 using the operating system 100 of FIG. 3 according to the teachings of the present invention. Kernel extensions 103 has allocated a lock data structure 400 with the high order bit 401A reserved. The lock data structure 400 may be, for example, a word, a double word, or any other equivalent data structure for locking resources controlled by the operating system 100.

After allocating the lock data structure 400, the Kernel extensions 103 invokes an instrumentation lock primitive 101C for overloading the lock data structure 400. The instrumentation lock primitive may be, for example, a "lock_alloc" primitive. The "lock_alloc" primitive overloads the lock data structure 400 in the following steps. First, an instrumentation lock data structure 404 is allocated. The instrumentation lock data structure 404 includes additional information used for development of accessories for the operating system 100 (FIG. 3). Second, the information contained within lock data structure 400 is copied into the first position of the instrumentation lock data structure 404. Finally, the lock data structure 400 is redesignated (overloaded) as a pointer to the instrumentation lock data structure 404, and the high order bit 401A set. The overloaded lock data structure 400 is indicated with a designation 402 so as to distinguish it from its original format. The setting of the high order bit 401A indicates to the instrumentation lock primitives 101C that an instrumentation lock data structure is being used, and to handle it accordingly.

Once Kernel extensions 103 has finished using the instrumentation lock data structure 404, it needs to de-allocate the instrumentation lock data structure 404. This is accomplished by invoking an instrumentation lock primitive 101C, such as "lock_free". After the instrumentation lock data structure 404 has been de-allocated, Kernel extensions 103 is responsible for de-allocating the lock data structure 400.

Kernel 100 also includes various commands for generating report data related to the use of instrumentation lock data structures. This report data may include, for example, number of times a lock was locked, busy, caller slept, or caller spun on lock It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. A method of using a single lock data structure for executing either development or non-development lock primitives, said method comprising the steps of:

selecting either said development or non-development lock primitives for execution;

overlaying said selected lock primitives;

executing one of said selected lock primitives, said one of said selected lock primitives using said single lock data structure.

2. The method of claim 1 wherein said step of selecting includes the step of:

selecting said development lock primitives for execution.

3. The method of claim 2 wherein said step of executing includes the steps of:

allocating a development lock data structure;

copying information from said single lock data structure into said development lock data structure;

overloading said lock data structure to point to the physical address of said development lock data structure; and executing one of said development lock primitives, said one of said development lock primitives using said single lock data structure and said development lock data structure.

4. The method of claim 3 wherein said development and non-development lock primitives are contained in a kernel having an operation mode of either development or non-development.

5. The method of claim 4 wherein said step of selecting includes the steps of:

determining that said kernel is operating in said development mode; and selecting, in response to said determination, said development lock primitives.

6. The method of claim 1 wherein said step of selecting includes the step of:

selecting said non-development lock primitives for execution.

7. The method of claim 6 wherein said step of executing includes the step of:

executing one of said non-development lock primitives, said one of said non-development lock primitives using said lock data structure.

8. A method of using a single lock data structure for executing either development or non-development lock primitives contained within a kernel, said kernel having a development mode and a non-development mode, said method comprising the steps of:

determining that said kernel is operating in said development mode;

overlaying, in response to said determination, said development lock primitives;

receiving said single lock data structure in said kernel;

allocating a development lock data structure;

copying data contained within said received lock data structure into said development lock data structure;

redefining said received lock data structure as a pointer to the physical address of said development lock data structure; and initializing said redefined lock data structure to point to the physical address of said development lock data structure.

9. The method of claim 8 wherein said kernel further includes a mode indication flag, and said method further comprises the step of:

setting said mode indication flag to indicate that said kernel is to operate in development mode.

10. The method of claim 9 wherein said step of determining includes the step of:

determining, from said mode indication flag, said kernel is operating in said development mode.

11. A data processing system for using a single lock data structure for executing either development or non-development lock primitives, said data processing system comprising:

means for selecting either said development or non-development lock primitives for execution;

means for overlaying said selected lock primitives;

means for executing one of said selected lock primitives, said one of said selected lock primitives using said single lock data structure.

12. The data processing system of claim 11 wherein said means for selecting includes:

means for selecting said development lock primitives for execution.

13. The data processing system of claim 12 wherein said means for executing includes:

means for allocating a development lock data structure;

means for copying information from said lock data structure into said development lock data structure;

means for overloading said lock data structure to point to the physical address of said development lock data structure; and means for executing one of said development lock primitives, said one of said development lock primitives using said lock data structure and said development lock data structure.

14. The data processing system of claim 13 wherein said development and non-development lock primitives are contained in a kernel having an operation mode of either development or non-development.

15. The data processing system of claim 14 wherein said means for selecting includes:

means for determining that said kernel is operating in said development mode; and means for selecting, in response to said determination, said development lock primitives.

16. The data processing system of claim 11 wherein said means for selecting includes:

means for selecting said non-development lock primitives for execution.

17. The data processing system of claim 16 wherein said means for executing includes:

means for executing one of said non-development lock primitives, said one of said non-development lock primitives using said lock data structure.

18. A data processing system for using a single lock data structure for executing either development or non-development lock primitives contained within a kernel, said kernel having a development mode and a non-development mode, said data processing system comprising:

means for determining that said kernel is operating in said development mode;

means for overlaying, in response to said determination, said development lock primitives;

means for receiving said single lock data structure in said kernel;

means for allocating a development lock data structure;

means for copying data contained within said received lock data structure into said development lock data structure;

means for redefining said received lock data structure as a pointer to the physical address of said development lock data structure; and means for initializing said redefined lock data structure to point to the physical address of said development lock data structure.

19. The data processing system of claim 18 wherein said kernel further includes a mode indication flag, and said data processing system further comprises:

means for setting said mode indication flag to indicate that said kernel is to operate in development mode.

20. The data processing system of claim 19 wherein said means for determining includes:

means for determining, from said mode indication flag, said kernel is operating in said development mode.

* * * * *